T. E. MURRAY, Jr.
METER TESTING CUT-OUT.
APPLICATION FILED DEC. 2, 1915.

1,192,547.

Patented July 25, 1916.
3 SHEETS—SHEET 1.

Inventor
Thomas E. Murray Jr.
By [signature]
His Attorney

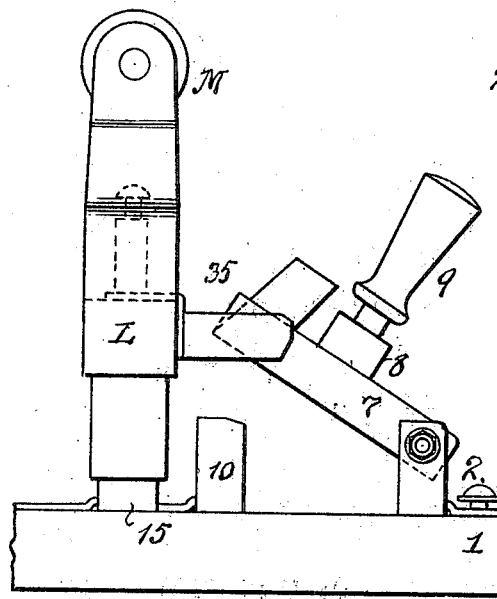
Fig. 6.
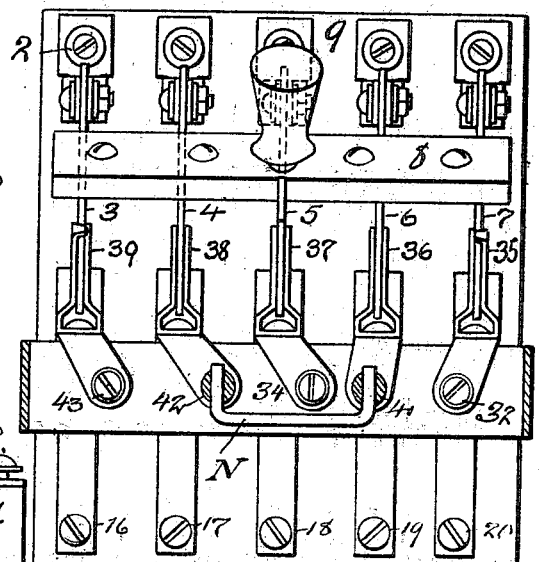
Fig. 7.
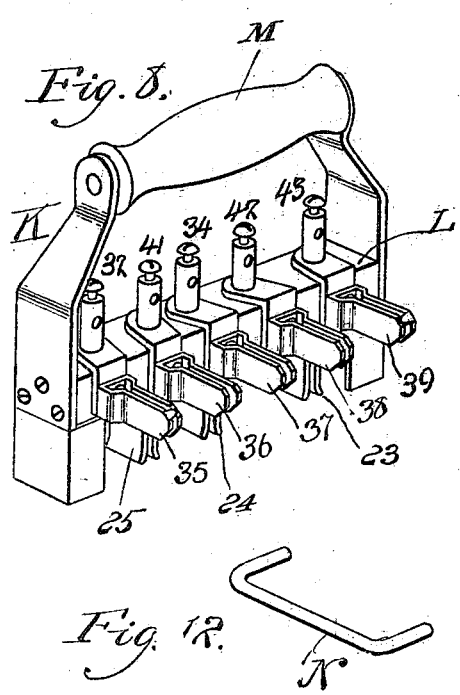
Fig. 8.
Fig. 12.
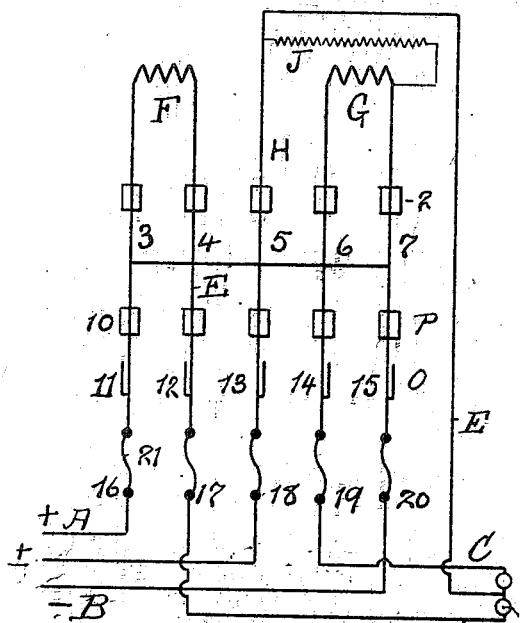
Fig. 9.

T. E. MURRAY, Jr.
METER TESTING CUT-OUT.
APPLICATION FILED DEC. 2, 1915.
1,192,547.
Patented July 25, 1916.
3 SHEETS—SHEET 3.
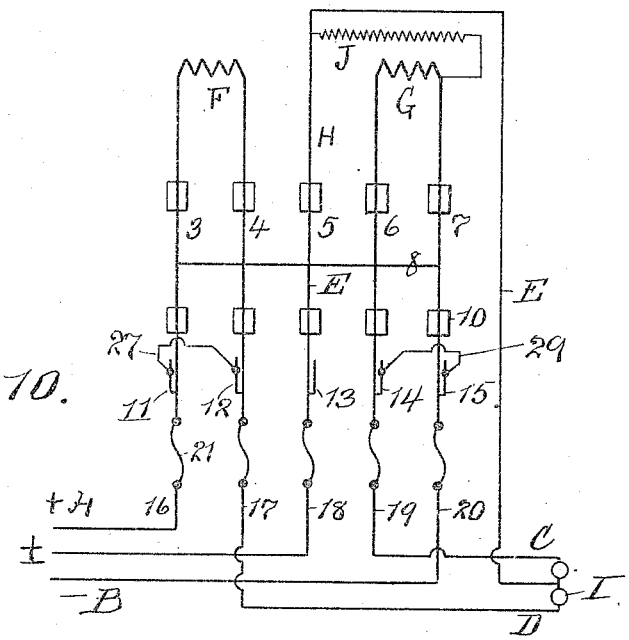
Fig. 10.
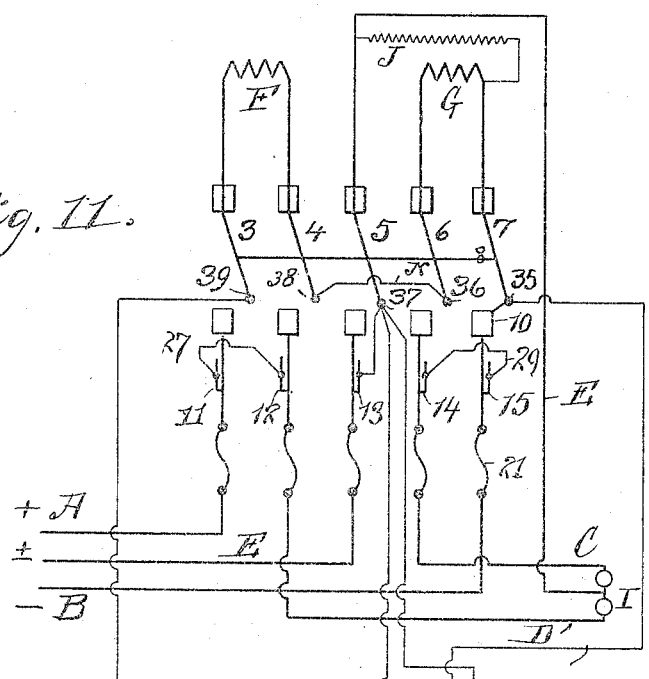
Fig. 11.
Inventor
Thomas E. Murray Jr
By his Attorney
Carl Benjamin

UNITED STATES PATENT OFFICE.

THOMAS E. MURRAY, JR., OF BROOKLYN, NEW YORK, ASSIGNOR TO THOMAS E. MURRAY, OF NEW YORK, N. Y.

METER-TESTING CUT-OUT.

1,192,547.

Specification of Letters Patent.

Patented July 25, 1916.

Application filed December 2, 1915. Serial No. 64,692.

*To all whom it may concern:*

Be it known that I, THOMAS E. MURRAY, Jr., a citizen of the United States, residing at Brooklyn, in the county of Kings and State of New York, have invented a certain new and useful Improvement in Meter-Testing Cut-Outs, of which the following is a specification.

The invention is a meter testing device, wherein the multiple pivoted levers of a service switch coöperate also with contacts on a separate device, with which contacts the testing apparatus is connected. The said device also coöperates with the line conductor terminals to shunt the load around the meter. When the device—here a gang plug—is placed in position, the load becomes shunted around the meter. The switch levers are then opened and moved to coöperate with the testing contacts on said device. The introduction of a bridge between the terminals of the pair of current coils of the meter finally completes the circuit through the meter and testing apparatus.

Figure 1:
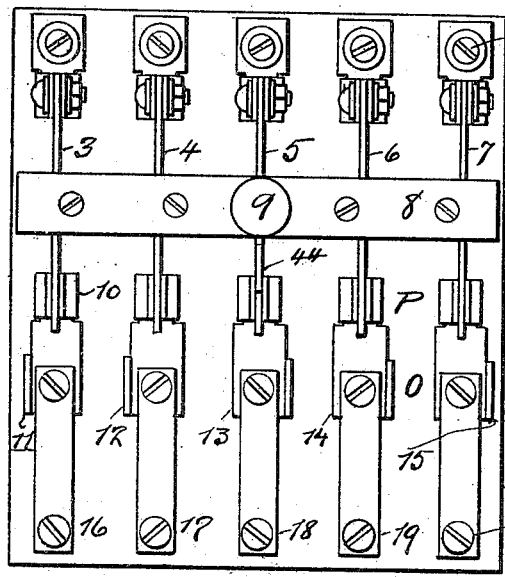
Figure 2:
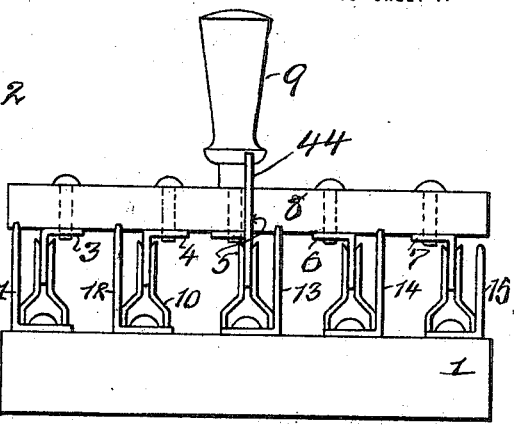
Figure 3:
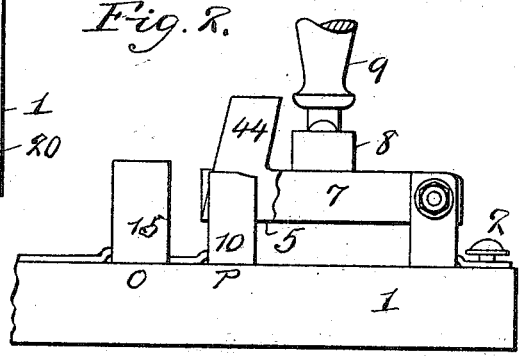
Figure 4:
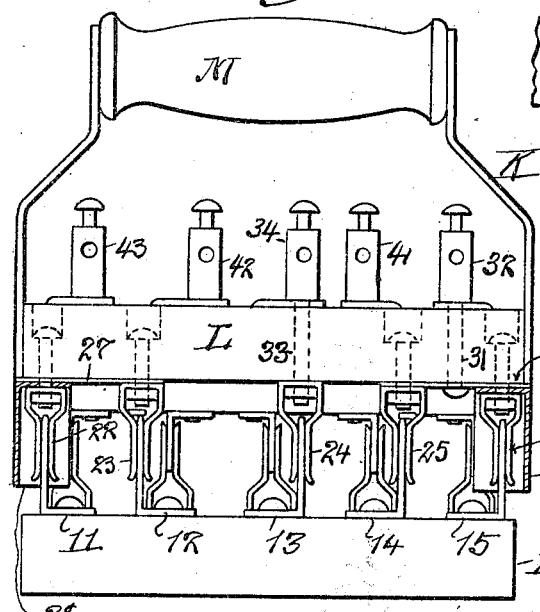
Figure 5:
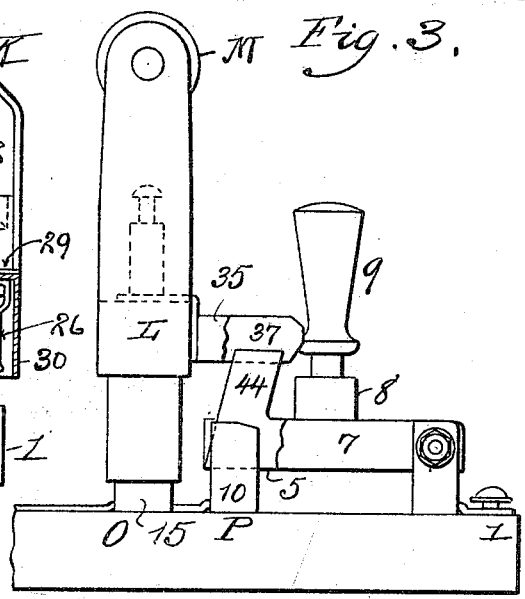

In the accompanying drawings—Figure 1 is a plan view of the instrument, the switches being closed. Fig. 2 is an end and Fig. 3 is a side elevation, with the parts as shown in Fig. 1. Fig. 4 is an end and Fig. 5 a side elevation, showing the gang plug in place. Fig. 6 is a side elevation and Fig. 7 a plan view, showing the gang plug in place and the switch levers opened and coöperating with the contacts 35, 36, 37, 38, 39 on the gang plug. Fig. 8 is a perspective view of the gang plug separately. Fig. 9 is an electrical diagram corresponding to Fig. 1, showing the circuits closed by the service switch through the meter to the customer's load. Fig. 10 is a similar diagram corresponding to Fig. 4, showing the circuits when the gang plug K is in place. Fig. 11 is a similar diagram corresponding to Fig. 6, showing the circuits when the gang plug is in place and the service switch levers are coöperating with the contacts 35, 36, 37, 38, 39, this being the condition while the test is being made. Fig. 12 is a separate perspective view of the bridge N, shown also in Figs. 7 and 11.

Similar numbers and letters of reference indicate like parts.

Referring first to Figs. 1 and 9: 1 is the base of the instrument. On said base are the meter terminals 2, to which are pivoted the switch levers 3, 4, 5, 6, 7, connected by a bar 8 of insulating material, provided with an operating handle 9. Said connected levers form the service switch, and coöperate with five pairs of fixed contact clips 10 disposed in a row, indicated by the letter P. Said clips are electrically connected to the same number of fixed contact plates 11, 12, 13, 14, 15, disposed in a row O parallel to row P. The plates of row O are connected to the line conductor terminals 16, 17, 18, 19, 20, preferably through fuses 21, as shown in Fig. 9. Under normal running conditions, the positive and negative supply leads A, B, Fig. 9, are connected through said fuses to the terminals 16, 20; the positive and negative load leads C, D are connected to the terminals 17, 19, and the neutral lead E is connected to the terminal 18. The terminals of one current coil F of the meter are connected to the pivot-supports of levers 3 and 4. The terminals of the other current coil G are connected to the pivot supports of levers 6 and 7. The load neutral H is connected to the pivot support of lever 5. The load, represented by lamps, is indicated at I. The potential coil J is connected across from load neutral H to a terminal of current coil G. With the conditions as shown in Fig. 9, the switch levers 3, 4, 5, 6, 7 being closed, the meter is in circuit with the supply and load leads, and measures the current energy delivered to the customer.

The gang plug, generally designated by K, (Figs. 4 and 8) comprises a bar L of insulating material, having an operating handle M. On the under side of said bar are five pairs of contact clips 22, 23, 24, 25, 26, Fig. 4. Clips 22 and 23 at one end of bar L are electrically connected to metal plate 27, secured on said bar, integral with which plate is formed a guard-box 28, open on one side and inclosing contact clip 22. At the other end of bar L, clips 25 and 26 are electrically connected to a metal plate 29, secured on said bar, integral with which plate is formed a guard-box 30, open on one side and inclosing contact clip 26. Guard-boxes 28 and 30 are shown in section in Fig. 4. By means of a rod 31 extending through the bar L, plate 29 is connected to binding post 32 on the upper side of said bar, and in like manner contact clip 24 is connected by rod 33 to a binding post 34.

On one side of bar L are five pairs of contact clips 35, 36, 37, 38, 39, Fig. 8. By means of metal plates, these contact clips are connected respectively to binding posts 32, 41, 34, 42 and 43.

In making the test of the meter, the first step is to place the testing plug K upon the base, so that its contact clips 22 to 26 receive the contact plates 11 to 15 of row O, as shown in Fig. 4 and in the diagram Fig. 10. The plate 27 then forms a bridge between leads A and D, and similarly the plate 29 forms a bridge between leads B and C. The obvious result is to shunt the load around the meter, so that the service switch levers 3, 4, 5, 6, 7 may be opened without causing any interruption of service to the load. The next step is to insert the ends of the bridge N, Fig. 12, into the binding posts 41, 42, as shown in Figs. 7 and 11. The switch levers are then raised to bring their free ends into coöperation with the clips 35, 36, 37, 38, 39 on the gang plug K, as shown in Figs. 6, 7 and 11. The potential leads of the testing watt-meter W are connected respectively to the binding posts 35 and 37 (neutral). The current leads are connected to binding posts 39 and 37 (neutral); a load box T being included, as usual, in the connection to post 37. The meter is now connected for test by comparison with the testing watt-meter W, while service to the load remains unbroken. At the end of the middle switch lever 5 is a projection 44, which maintains constant contact with the clip 37, thus keeping circuit closed to the neutral lead E.

I claim:

1. In combination with line conductors, a meter of the type set forth, and a service switch comprising a plurality of pivoted levers, a separate device for shunting the load around the meter, a removable bridge connecting the meter coils in series, contacts on said separate device, and testing apparatus in circuit with said contacts: the said switch levers coöperating with said contacts to establish circuit through said meter and said testing apparatus.

2. In combination with line conductors, a meter of the type set forth, a base, meter and line conductor terminals thereon, and a service switch on said base comprising a plurality of pivoted levers, two rows O, P of fixed contacts on said base, corresponding contacts in each row being connected in series to said line conductor terminals, a gang plug coöperating with row O of said rows of contacts to shunt the load around the meter, a plurality of contacts 35, 36, 37, 38, 39 carried by said plug, testing apparatus connected to said contacts 35, 36, 37, 38, 39, and a removable bridge coöperating with two of said meter terminals for connecting the meter current coils in series: the said switch levers being movable into coöperation with the other row P of said fixed contacts to open and close circuit from supply to load, and with the contacts 35, 36, 37, 38, 39 on said plug to open and close circuit through said meter and said testing apparatus.

In testimony whereof I have affixed my signature in presence of two witnesses.

THOMAS E. MURRAY, Jr.

Witnesses:
MAY T. McGARRY,
GERTRUDE T. PORTER.